Patented Sept. 29, 1953

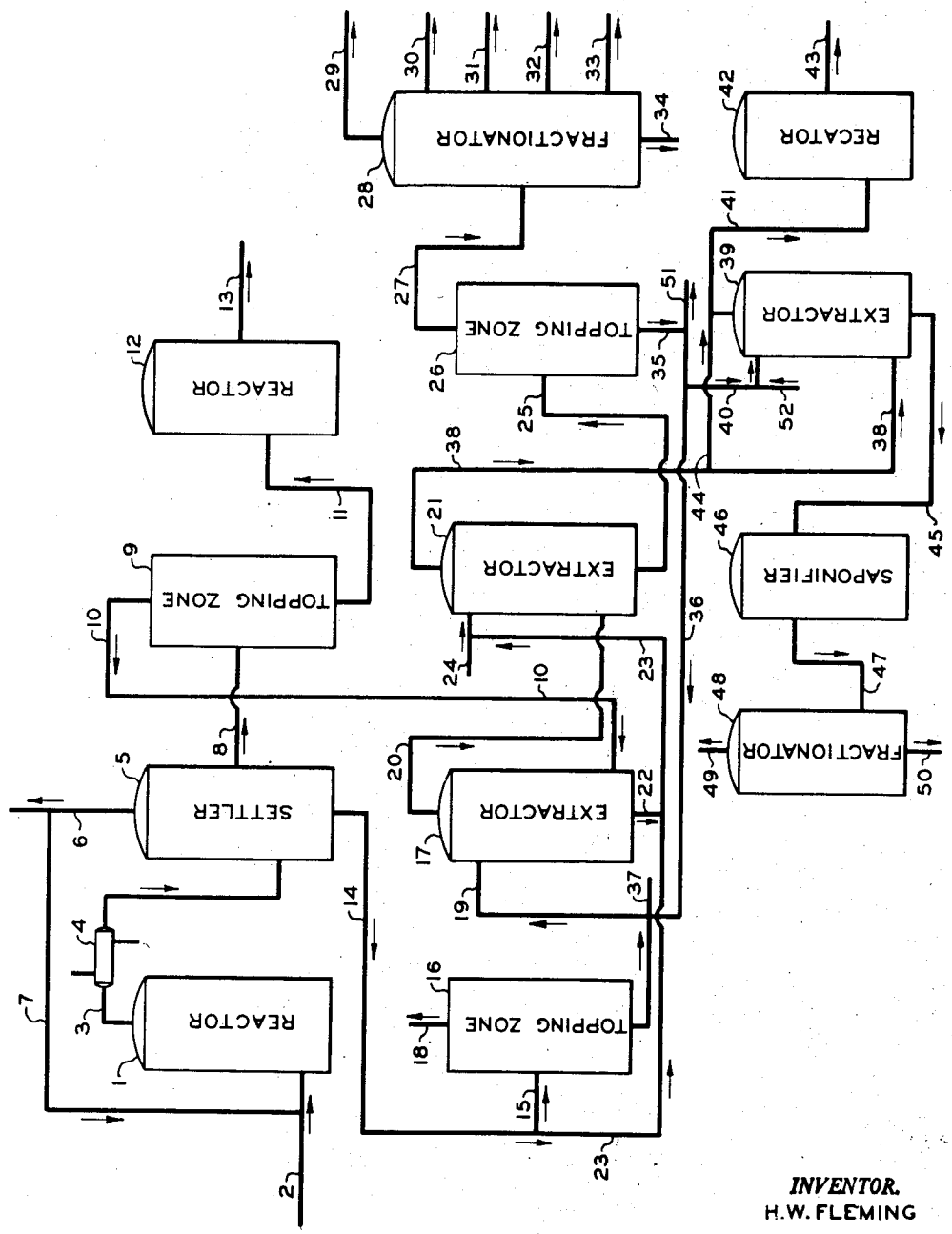

2,653,961

UNITED STATES PATENT OFFICE 2,653,961

RECOVERY OF OXYGEN COMPOUNDS FROM FISCHER-TROPSCH PRODUCT

Harold W. Fleming, Bartlesville, Okla., assignor to Phillips Petroleum Company, a corporation of Delaware Application June 27, 1949, Serial No. 101,656

17 Claims. (Cl. 260—450)

This invention relates to a process for treating normally liquid effluent resulting from the catalytic hydrogenation of a carbon oxide. In one aspect, this invention relates to the recovery of oxygenated organic compounds formed as by-products when hydrocarbons are synthesized from carbon monoxide and hydrogen. In another specific aspect, this invention relates to a process for separating the normally liquid oxygenated compounds resulting from the catalytic hydrogenation of carbon oxide into one group containing those oxygenated compounds more soluble in water than in hydrocarbons and into a second group containing those oxygenated compounds more soluble in hydrocarbons than in water. In one embodiment, this invention relates to a process for separating the normally liquid oxygenated compounds resulting from the hydrogenation of carbon monoxide in the presence of a fluidized iron catalyst into one group containing low-boiling oxygenated compounds and into a second group containing higher boiling oxygenated compounds.

In the catalytic hydrogenation of a carbon oxide, a product comprising hydrocarbons and oxygenated hydrocarbon derivatives is obtained in relative yields dependent upon the choice of catalyst and of hydrogenation conditions. For example, hydrogen and carbon monoxide may be passed into a catalytic zone containing an iron catalyst suitable for the production of hydrocarbons as the principal reaction product. During the reaction oxygenated organic compounds, water and carbon dioxide are also formed. The total normally liquid product is readily separable into a hydrocarbon phase and an aqueous phase, and the oxygenated compounds are distributed throughout both phases. The aqueous phase contains oxygenated compounds which range in decreasing concentration from those that are completely miscible with water to those that are only slightly soluble in water. The reverse is true in the hydrocarbon phase where the oxygenated compounds range in decreasing concentration from those that are completely immiscible with water to those that are completely miscible with water. Usually the concentration of oxygenated compounds in the aqueous phase varies from one to twelve per cent, and the concentration of oxygenated compounds in the hydrocarbon phase varies from one to fifteen per cent. Both concentrations are dependent upon the operating conditions and upon the specific catalyst used. Even higher concentrations in both phases are obtainable by effecting the hydrogenation reaction with an iron catalyst at a relatively low temperature within the range of 190 to 225° C. and by using a hydrogen to carbon monoxide ratio in the synthesis gas feed of about 1:1.

The recovery of oxygenated organic compounds from the hydrogenation reaction products is usually accomplished by condensation and separation of the normally liquid products into an aqueous phase and a hydrocarbon phase with subsequent processing of each phase to recover the oxygenated organic compounds. Both phases contain oxygenated organic compounds, such as alcohols, aldehydes, ketones and acids, and some of the compounds are found in both phases. The number of individual compounds is large, and, consequently, the separation of the individual compounds presents a complex problem involving the use of many processing steps.

It is an object of this invention to provide a novel process for treating normally liquid effluent resulting from the catalytic hydrogenation of a carbon oxide.

It is another object of this invention to provide a novel process for recovering oxygenated organic compounds formed as by-products when hydrocarbons are synthesized from carbon monoxide and hydrogen.

It is a further object of this invention to provide a process for separating the oxygenated organic compounds resulting from such a synthesis into one group containing those compounds more soluble in water than in hydrocarbons and into a second group containing those compounds more soluble in hydrocarbons than in water.

It is a further object of this invention to provide a process for separating the normally liquid oxygenated compounds resulting from the hydrogenation of carbon monoxide in the presence of a fluidized iron catalyst into one group containing low-boiling oxygenated compounds and into a second group containing higher boiling oxygenated compounds.

It is a further object of this invention to provide a novel process for recovering individual oxygenated organic compounds resulting from the hydrogenation of carbon monoxide.

Additional objects of this invention will be readily apparent from my disclosure as it appears herein.

I have found that the oxygenated organic compounds produced during the synthesis of hydrocarbons from hydrogen and carbon monoxide can be recovered by a process that avoids the complexity of processing steps encountered in prior art practice. My invention makes use of the tendency of the individual oxygenated compounds to concentrate in either the aqueous phase or the hydrocarbon phase, and, as a result of the partition relationship of the individual compounds, recovery thereof is markedly simplified.

A detailed understanding of my invention can be obtained from the description of the accompanying drawing hereinbelow. The drawing is schematic, and such conventional equipment as valves, pumps, compressors, etc. have not been included in the drawing in order to facilitate the understanding of my invention. The inclusion of such equipment is within the scope of my invention.

My invention is applicable to the normally liquid effluent resulting from the Fischer-Tropsch synthesis. This reaction is effected by contacting a gaseous mixture containing hydrogen and carbon monoxide in a molar ratio within the range of 1:1 to 3:1, preferably 1.8: to 2.2:1, and more preferably 2:1, with a suitable catalyst at an elevated temperature and pressure. The catalyst is selected from the group containing iron, cobalt, nickel and ruthenium, and it may be used on an inert support, such as kieselguhr, and promoted with minor amounts of metallic oxides, such as the oxides of alkali and alkaline earth metals, thoria, silica and the like. The catalyst may be used in a fixed bed operation, but the fluidized catalyst technique is preferred. Reaction temperatures and pressures are dependent upon the specific catalyst used. I prefer to use a finely divided, reduced iron catalyst promoted with oxides of potassium, aluminum and calcium since this type of catalyst generally produces larger quantities of oxygenated organic chemicals than other known catalysts for the reaction. With this preferred catalyst the synthesis reaction is effected at temperatures within the range of 295 to 320° C., at superatmospheric pressures up to 150 atmospheres and higher and at catalyst fluidizing conditions.

Referring to Figure 1, a hydrocarbon synthesis is effected in reactor 1 which contains a fluidized bed of a reduced iron catalyst. Snythesis gas containing hydrogen and carbon monoxide enter reactor 1 via line 2, and the reaction effluent passes via line 3 and condenser 4 to settler 5. In settler 5 the condensed reaction effluent stratifies into a liquid hydrocarbon phase, an aqueous phase and a gaseous phase. The gaseous phase contains low-boiling, normally gaseous hydrocarbons, carbon dioxide and unreacted carbon monoxide and hydrogen, and it is withdrawn from settler 5 via line 6, and at least a portion of the gas is recycled to reactor 1 via lines 7 and 2. If desired a portion of the gaseous phase may pass to a synthesis gas producing zone (not shown) for the production of additional quantities of hydrogen and carbon monoxide, and, alternatively, the hydrogen-rich gaseous phase may be used to regenerate catalyst that has become deactivated in reactor 1.

The hydrocarbon phase containing normally liquid hydrocarbons, water-soluble and water-insoluble oxygenated organic compounds passes from settler 5 via line 8 to topping zone 9, and in zone 9 the hydrocarbon phase is topped at a temperature such that substantially all the water-soluble oxygenated compounds in the hydrocarbon phase are taken overhead. The topping temperature required is dependent upon the catalyst and operating conditions used in reactor 1, and it is usually within the range of 150 to 200° C. I prefer to use a temperature of 160° C., and the overhead fraction that boils below 160° C. passes from zone 9 via line 10 to an extraction step, to be described hereinbelow. The fraction of the hydrocarbon phase boiling above 160° C. passes from zone 9 via line 11 to reactor 12 where the fraction s subjected to additional treatment, if desired. In reactor 12 the fraction boiling above 160° C. may be treated for removal of high-boiling, hydrocarbon soluble oxygenated compounds, for example, by liquid-liquid extraction with a glycol solvent, such as ethylene glycol or diethylene glycol, which selectively dissolves oxygenated organic compounds. Alternatively, in reactor 12 the fraction boiling above 160° C. may be passed in the vapor phase and at a temperature of 370 to 420° C. into contact with a catalyst, such as bauxite, magnesia or activated clay, which converts the oxygenated compounds to hydrocarbons. An oxygen-free hydrocarbon product is then withdrawn from reactor 12 via line 13 as a product of the process, and it may then be fractionated to obtain desired hydrocarbon fractions, one of which may be a fraction boiling within the gasoline range.

The aqueous phase from settler 5 is withdrawn via line 14. A portion of the aqueous phase passes via line 15 to topping zone 16. It should be noted that topping zone 16 may be used only while the process is being started, since an aqueous mixture substantially identical to the topped aqueous phase from zone 16 is obtained and recycled from a subsequent step in my process for use in extractor 17. In zone 16 the portion of the aqueous phase therein is topped at a temperature above 80° C., but below the boiling point of water at atmospheric conditions. I have found that a temperature of 98° C. is suitable. The overhead fraction from zone 16 is removed via line 18, and, since this fraction contains low-boiling oxygenated organic compounds, the overhead fraction may be treated, if desired, for the separation of those compounds. The topped fraction from zone 16 which contains water and organic acids passes via line 19 to extractor 17 where it contacts, preferably countercurrently, the overhead fraction from topping zone 9 which enters extractor 17 via line 10. Extractor 17 is operated at conditions such that liquid-liquid contacting is effected in the extraction zone. Atmospheric temperature and pressure are suitable for the extraction step, but higher and lower temperatures and pressures may be used, if desired. In extractor 17 the topped aqueous phase acts as an extracting solvent for extracting low-boiling oxygenated organic compounds from the overhead from zone 9. To effect the extraction in extractor 17 of oxygenated compounds from the hydrocarbon phase with the aqueous solvent, a volumetric ratio of aqueous solvent to hydrocarbon phase within the range of 0.5:1 to 2:1 is used.

From extractor 17 a raffinate phase, containing hydrocarbons and oxygenated organic compounds more soluble in hydrocarbons than in water and boiling not higher than 160° C., is withdrawn via line 20 through which it passes to second extractor 21. The solvent phase from extractor 17, which contains water, organic acids and low-boiling oxygenated organic compounds more soluble in water than in hydrocarbons is withdrawn via line 22, and it passes along with aqueous phase from settler 5, passing in lines 14 and 23, to extractor 21. In extractor 21 the raffinate phase from extractor 17 is used as the solvent to extract from the aqueous phase oxygenated organic compounds more soluble in hydrocarbons than in water. Countercurrent liquid-liquid extraction is preferably used in extractor 21, and the temperature and pressure are similar to those used in extractor 17. In order to effect the desired extraction in extractor 21 a volumetric ratio of aqueous phase to hydrocarbon phase higher than that used in extractor 17 is employed. Generally, the volumetric ratio falls within the range of 2:3 to 4:1, and, if necessary to obtain a volumetric ratio within this expressed range, fresh water is introduced to the system via line 24. Alternatively, the fresh water may be introduced directly to extractor 21 at a single point or multipointwise in order to maintain the desired volumetric ratio throughout the extractor.

From extractor 21 an aqueous phase, from which oxygenated organic compounds more soluble in hydrocarbons than in water have been extracted, is withdrawn via line 25. This aqueous phase contains, in addition to water, organic acids, and low-boiling alcohols, aldehydes and ketones. The alcohols are butanol and lower-boiling alcohols; the aldehydes are acetaldehyde and propionaldehyde; and the ketones are acetone and methyl ethyl ketone. The aqueous phase passes via line 25 to topping zone 26 which is operated at a temperature below the boiling point of water and above the boiling point of an azeotrope of n-butyl alcohol and water, which is 92.4° C. at atmospheric pressure. I have found a temperature of 98° C. to be suitable for topping the aqueous phase in zone 26. The overhead from zone 26 passes via line 27 to fractionator 28 wherein the overhead is fractionated and, thus, separated into components of the overhead. From fractionator 28 an overhead fraction containing acetaldehyde and boiling at 20° C. is withdrawn via line 29. A second fraction containing an azeotropic mixture of propionaldehyde, acetone and methyl alcohol, boiling from 54 to 56° C., is withdrawn via line 30. A third fraction containing an azeotropic mixture of methyl ethyl ketone, ethyl alcohol and water, boiling at 72° C., is withdrawn via line 31. Separate fractions containing ethyl alcohol and n-propyl alcohol are withdrawn via lines 32 and 33, respectively, and the kettle product containing an azeotrope of n-butyl alcohol and water is withdrawn via line 34.

Topped aqueous phase from zone 26, which contains organic acids and any high-boiling oxygenated organic compounds boiling above 98° C. that were not removed in extractor 21, is withdrawn via line 35. A portion of the topped aqueous phase passes via lines 36 and 19 to extractor 17 where it is used as the solvent, and in extractor 17 the topped aqueous phase from zone 26 is used in lieu of topped aqueous phase from zone 16. Topping zone 16 is not required for further operation of my process until it becomes necessary to cease and then to recommence operation. Actually, topping zone 16 is not essential to my process and it can be eliminated by introducing to line 19, via line 37, fresh water containing organic acids from an outside source. Fresh water alone could be used, but it is preferred to use water containing organic acids, since the organic acids enhance the solvent powers of the water in extractor 17 and the organic acids inhibit the extraction of organic acids in extractor 17 from the hydrocarbon phase into a dilute solvent phase.

From extractor 21, a hydrocarbon phase containing oxygenated organic compounds more soluble in hydrocarbons than in water is withdrawn via line 38. This hydrocarbon phase contains, in addition to normally liquid hydrocarbons boiling no higher than 160° C., aldehydes containing more than three carbon atoms per molecule and alcohols and ketones containing more than four carbon atoms per molecule. If it is desired to recover these oxygenated organic compounds, the hydrocarbon phase is passed via line 38 to extractor 39 where it is contacted countercurrently in liquid-liquid extraction with a portion of the topped aqueous phase from zone 26 which enters extractor 39 via lines 35 and 40. The temperature and pressure conditions in extractor 39 are similar to the conditions prevailing in extractors 17 and 21, and a volumetric ratio of aqueous phase to hydrocarbon phase in extractor 39 is maintained within the range of 1:4 to 5:1. In extractor 39 the aqueous phase solvent extracts oxygenated organic compounds from the hydrocarbon phase. Hydrocarbons, containing any unextracted oxygenated compounds, leave extractor 39 via line 41, and, if desired, the oxygenated organic compounds may be converted to the corresponding hydrocarbons in reactor 42 which is similar to reactor 12, described hereinabove. Hydrocarbons are removed via line 43, and suitable additional treatment, such as fractionation, can be used to separate the hydrocarbon mixture into individual components of the mixture.

The concentration of oxygenated organic compounds in the hydrocarbon phase from extractor 21 is relatively small, and in some operations it may be economically undesirable to extract the oxygenated compounds therefrom. In that event, the hydrocarbon phase may be passed directly to reactor 42 via lines 38, 44 and 41 for conversion of the oxygenated compounds to hydrocarbons.

Aqueous solvent from extractor 39, containing, in addition to water, organic acids, alcohols higher boiling than butyl alcohol, aldehydes higher boiling than propionaldehyde, and ketones higher boiling than methyl ethyl ketone, is withdrawn via line 45 and passed to any suitable means for recovering the oxygenated compounds. One method for effecting the recovery involves passing the aqueous solvent via line 45 to saponifier 46 where organic acids and any esters that are present are converted to water-soluble metallic salts. Sodium hydroxide is a suitable saponifying agent, and sodium salts of the organic acids and esters are produced. After saponification, the total effluent from saponifier 46 passes via line 47 to fractionator 48 from which the alcohols and ketones are recovered overhead via line 49 with unpolymerized aldehydes. Sodium salts of the organic acids and water-insoluble polymers of the aldehydes are recovered via line 50 in the bottoms product from fractionator 48. The polymers may be separated by filtration (not shown) and the sodium salts are then reconverted to organic acids by treatment with a mineral acid (by means not shown).

In some instances, it will be unnecessary to use the entire topped aqueous phase from zone 26 in extractors 17 and 39, and, in that event, unrequired topped aqueous phase is withdrawn from the system via line 51. The withdrawn portion contains organic acids, and it may be advisable to recover these acids by methods known in the art. On the other hand, the topped aqueous phase from zone 26 may, in some instances, be insufficient for the extraction steps in extractors 17 and 19, and, in that event, fresh water is added to the system via line 37 and/or line 52.

In my disclosure hereinabove, I have referred to the oxygenated organic compounds as being either more soluble in water than in hydrocarbons or more soluble in hydrocarbons than in water. The oxygenated compounds that I extract either from hydrocarbons in extractor 17 or from water in extractor 21 are soluble both in hydrocarbons and in water, but each compound has a relatively higher solubility in one of hydrocarbons and water as compared with the other of these two solvents. The following table shows the solubilities of various oxygenated compounds in 100 parts of water at a temperature of 10 to 25° C.:

*Table*

| | |
|---|---|
| Propionaldehyde | 20 |
| Butyraldehyde | 4 |
| Methyl ethyl ketone | 25 |
| Methyl propyl ketone | 4 |
| N-butyl alcohol | 9 |
| N-amyl alcohol | 2.7 |

The oxygenated organic compounds which I have termed lower-boiling and which are more soluble in water than in hydrocarbons are those compounds which have a solubility above five parts in 100 parts of water at a temperature of 10 to 25° C. Those oxygenated organic compounds which are less soluble in water I have termed higher-boiling and they are more soluble in hydrocarbons than in water.

My disclosed process and invention are subject to various modifications which will fall within the scope of my invention.

I claim:

1. The process for treating normally liquid effluent from the catalytic hydrogenation of a carbon oxide which comprises separating said effluent into a hydrocarbon phase and an aqueous phase, separating from said hydrocarbon phase a fraction having an end boiling point in the range 150° C.–200° C. and comprising essentially hydrocarbons and oxygenated organic compounds more soluble in water than in hydrocarbons, directly contacting said fraction with water, recovering from said contacting step a hydrocarbon phase substantially free of normally liquid oxygenated organic compounds more soluble in water than in hydrocarbons, directly contacting thus-recovered hydrocarbon phase with said aqueous phase separated from said reaction effluent, and recovering from said last-named contacting step a hydrocarbon phase enriched with normally liquid oxygenated organic compounds more soluble in hydrocarbons than in water from said first-named aqueous phase and an aqueous phase substantially free of normally liquid oxygenated organic compounds more soluble in hydrocarbons than in water.

2. The process for treating normally liquid effluent from the synthesis of organic compounds from hydrogen and carbon monoxide in the presence of a reduced iron catalyst which comprises separating said effluent into a hydrocarbon phase and an aqueous phase, separating from said hydrocarbon phase a fraction having an end boiling point in the range 150° C.–200° C. and comprising essentially hydrocarbons and oxygenated organic compounds more soluble in water than in hydrocarbons, directly contacting said fraction with water containing organic acids at liquid-liquid contacting conditions, recovering from said contacting step a hydrocarbon phase substantially free of normally liquid oxygenated organic compounds more soluble in water than in hydrocarbons, directly contacting thus-recovered hydrocarbon phase with said aqueous phase separated from said reaction effluent at liquid-liquid contacting conditions, and recovering from said last-named contacting step a hydrocarbon phase enriched with normally liquid oxygenated organic compounds more soluble in hydrocarbons than in water from said first-named aqueous phase and an aqueous phase substantially free of normally liquid oxygenated organic compounds more soluble in hydrocarbons than in water.

3. A process for recovering normally liquid oxygenated organic compounds produced during the synthesis of organic compounds from hydrogen and carbon monoxide in the presence of a fluidized reduced iron catalyst which comprises separating the normally liquid effluent from said synthesis reaction into a hydrocarbon phase and an aqueous phase, recovering from said hydrocarbon phase a fraction having an end boiling point in the range 150° C–200° C. and comprising essentially hydrocarbons and oxygenated organic compounds more soluble in water than in hydrocarbons, directly contacting at liquid-liquid contacting conditions said hydrocarbon phase fraction with water containing organic acids, recovering from said contacting step a hydrocarbon phase from which oxygenated organic compounds more soluble in water than in hydrocarbons have been extracted, directly contacting at liquid-liquid contacting conditions thus-recovered hydrocarbon phase with said aqueous phase from said synthesis reaction effluent, recovering from said last-named contacting step a hydrocarbon phase enriched with normally liquid oxygenated organic compounds more soluble in hydrocarbons than in water from said first-named aqueous phase and an an aqueous phase containing normally liquid oxygenated organic compounds more soluble in water than in hydrocarbons, and separating from said thus-recovered aqueous phase a fraction containing low-boiling oxygenated organic compounds and boiling below 100° C.

4. A process according to claim 3 wherein the fraction recovered from the hydrocarbon phase of the normally liquid synthesis reaction effluent has an end boiling point not higher than 160° C.

5. A process according to claim 3 wherein the water containing organic acids for the first contacting step is obtained by separating a fraction from a portion of the aqueous phase of the normally liquid synthesis reaction effluent having a boiling point above 80° C. but below 100° C.

6. A process according to claim 5 wherein the end boiling point of the fraction so-obtained is 98° C.

7. A process according to claim 3 wherein the aqueous solvent phase from the first contacting step is admixed with the aqueous phase for the second contacting step.

8. A process according to claim 3 wherein the first contacting step is effected with a volumetric ratio of aqueous solvent to hydrocarbon phase within the range of 0.5:1 to 2:1.

9. A process according to claim 3 wherein the second contacting step is effected with a volumetric ratio of aqueous phase to hydrocarbon phase greater than in the first contacting step and within the range of 2:3 to 4:1.

10. A process according to claim 3 wherein at least a portion of a fraction of the aqueous phase from the last-named separating step from which low-boiling oxygenated organic compounds have been separated is recycled to the first-named contacting step.

11. A process according to claim 3 wherein at least a portion of a fraction of the aqueous phase from the last-named separating step from which low-boiling oxygenated organic compounds have been separated is contacted at liquid-liquid contacting conditions with hydrocarbon phase from the last-named contacting step and wherein an aqueous phase containing oxygenated organic compounds from said hydrocarbon phase is recovered and wherein oxygenated organic compounds are separated from the thus-recovered aqueous phase.

12. A process according to claim 11 wherein the volumetric ratio of aqueous phase to hydrocarbon phase in the contacting step is within the range of 1:4 to 5:1.

13. A process according to claim 3 wherein the oxygenated organic compounds more soluble in water than in hydrocarbons have a solubility above 5 parts in 100 parts of water at a temperature of 10 to 25° C.

14. A process according to claim 13 wherein the oxygenated organic compounds comprise acetaldehyde, propionaldehyde, acetone, methyl ethyl ketone, methanol, ethanol, propanol and butanol.

15. A process according to claim 3 wherein the oxygenated organic compounds more soluble in hydrocarbons than in water have a solubility not above 5 parts in 100 parts of water at a temperature of 10 to 25° C.

16. A process according to claim 15 wherein the oxygenated organic compounds comprise aldehydes higher boiling than propionaldehyde, ketones higher boiling than methyl ethyl ketone and alcohols higher boiling than butanol.

17. The process for treating normally liquid effluent from the catalytic hydrogenation of a carbon oxide which comprises separating said effluent into a liquid hydrocarbon phase and a liquid aqueous phase, separating from said hydrocarbon phase a fraction having an end boiling point in the range 150° C.–200° C. and comprising essentially hydrocarbons and oxygenated organic compounds more soluble in water than in hydrocarbons, directly contacting said fraction with an aqueous solution boiling above 98° C. and containing organic acids, recovering from said contacting step a liquid hydrocarbon phase substantially free of normally liquid oxygenated organic compounds more soluble in water than in hydrocarbons, directly contacting said recovered liquid hydrocarbon phase with said separated liquid aqueous phase from said effluent, recovering from this contacting step a liquid hydrocarbon phase enriched with respect to normally liquid oxygenated organic compounds more soluble in hydrocarbons than in water and an aqueous phase substantially free of normally liquid oxygenated organic compounds more soluble in hydrocarbons than in water and separating from the above said aqueous phase an aqueous solution boiling above 98° C. and containing organic acids.

HAROLD W. FLEMING.

References Cited in the file of this patent

UNITED STATES PATENTS

| Number | Name | Date |
|---|---|---|
| 2,476,788 | White | July 19, 1949 |
| 2,482,284 | Michael et al. | Sept. 20, 1949 |
| 2,501,115 | White | Mar. 21, 1950 |
| 2,505,752 | Burton | May 2, 1950 |
| 2,535,069 | Johnson | Dec. 26, 1950 |